(12) United States Patent
Cui et al.

(10) Patent No.: US 11,086,668 B2
(45) Date of Patent: Aug. 10, 2021

(54) METHOD, ELECTRONIC DEVICE AND COMPUTER PROGRAM PRODUCT FOR PROCESSING TASK

(71) Applicant: EMC IP Holding Company LLC, Hopkinton, MA (US)

(72) Inventors: Wei Cui, Beijing (CN); Kun Wang, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 142 days.

(21) Appl. No.: 16/441,459

(22) Filed: Jun. 14, 2019

(65) Prior Publication Data

US 2020/0319922 A1    Oct. 8, 2020

(30) Foreign Application Priority Data

Apr. 4, 2019   (CN) .......................... 201910271707.9

(51) Int. Cl.
*G06F 9/48*   (2006.01)
*G06F 9/50*   (2006.01)

(52) U.S. Cl.
CPC .............. *G06F 9/4881* (2013.01); *G06F 9/50* (2013.01)

(58) Field of Classification Search
CPC .... G06F 9/4881; G06F 9/5011; G06F 9/5061; G06F 9/542
See application file for complete search history.

(56) References Cited

U.S. PATENT DOCUMENTS

| 2008/0183779 A1* | 7/2008 | Jia ........................... G06F 9/546 708/1 |
| 2009/0037511 A1* | 2/2009 | Almasi .................. G06F 9/542 709/201 |
| 2019/0303159 A1* | 10/2019 | Fryman ................. G06F 9/3881 |

* cited by examiner

*Primary Examiner* — Dong U Kim
(74) *Attorney, Agent, or Firm* — Ryan, Mason & Lewis, LLP (57) ABSTRACT

Embodiments of the present disclosure provide a method, an electronic device and a computer program product for processing a task. The method comprises: obtaining a first group of processing results generated from processing, by a first group of processing resources of a first device, a first group of sub-tasks in the task; performing a first AllReduce operation on the first group of processing results to obtain a first AllReduce result; obtaining a second AllReduce result from a second device, the second AllReduce result being obtained by performing a second AllReduce operation on a second group of processing results generated from processing, by a second group of processing resources of the second device, a second group of sub-tasks in the task; and performing a third AllReduce operation on the first AllReduce result and the second AllReduce result to obtain a processing result of the task.

20 Claims, 4 Drawing Sheets

METHOD, ELECTRONIC DEVICE AND COMPUTER PROGRAM PRODUCT FOR PROCESSING TASK

RELATED APPLICATION(S)

The present application claims priority to Chinese Patent Application No. 201910271707.9, filed Apr. 4, 2019, and entitled "Method, Electronic Device and Computer Program Product for Processing Task," which is incorporated by reference herein in its entirety.

FIELD

Embodiments of the present disclosure generally relate to the field of data processing, and more specifically, to a method, an electronic device and a computer program product for processing a task.

BACKGROUND

With development of computer technologies, types of processing resources become richer and computing power thereof becomes stronger. Processing resources, due to their distinctive characteristics, are particularly suitable for processing a variety of types of computing tasks, such as deep learning, machine learning, data mining, high-performance computing, etc. In some cases, the amount of computation involved in these computing tasks is sometimes enormous. For example, millions of pictures need to be scanned when an electronic device is training a deep learning model, which leads to a plurality of processing resources being required to jointly complete one task. However, during a process of jointly completing one task, data is frequently exchanged between the plurality of processing resources to ensure data synchronization, which further results in an occupation of a large amount of network resources and thus lowers efficiency of task processing.

SUMMARY

Embodiments of the present disclosure provide a method, an electronic device and a computer program product for processing a task.

In a first aspect of the present disclosure, there is provided a method of processing a task. The method comprises: obtaining a first group of processing results generated from processing, by a first group of processing resources of a first device, a first group of sub-tasks in the task; performing a first AllReduce operation on the first group of processing results to obtain a first AllReduce result; obtaining a second AllReduce result from a second device, the second AllReduce result being obtained by performing a second AllReduce operation on a second group of processing results generated from processing, by a second group of processing resources of the second device, a second group of sub-tasks in the task; and performing a third AllReduce operation on the first AllReduce result and the second AllReduce result to obtain a processing result of the task.

A second aspect of the present disclosure provides an electronic device. The electronic device comprises: a processor; and a memory storing computer program instructions, the processor executing the computer program instructions in the memory to control the device to perform actions comprising: obtaining a first group of processing results generated from processing, by a first group of processing resources of a first device, a first group of sub-tasks in the task; performing a first AllReduce operation on the first group of processing results to obtain a first AllReduce result; obtaining a second AllReduce result from a second device, the second AllReduce result being obtained by performing a second AllReduce operation on a second group of processing results generated from processing, by a second group of processing resources of the second device, a second group of sub-tasks in the task; and performing a third AllReduce operation on the first AllReduce result and the second AllReduce result to obtain a processing result of the task.

A third aspect of the present disclosure provides a computer program product. The computer program product is tangibly stored on a non-transitory computer storage medium and comprises machine-executable instructions. The machine-executable instructions, when executed by a device, cause the device to perform actions comprising: obtaining a first group of processing results generated from processing, by a first group of processing resources of a first device, a first group of sub-tasks in the task; performing a first AllReduce operation on the first group of processing results to obtain a first AllReduce result; obtaining a second AllReduce result from a second device, the second AllReduce result being obtained by performing a second AllReduce operation on a second group of processing results generated from processing, by a second group of processing resources of the second device, a second group of sub-tasks in the task; and performing a third AllReduce operation on the first AllReduce result and the second AllReduce result to obtain a processing result of the task.

Embodiments of the present disclosure can reduce the amount of data exchange between a plurality of devices during parallel processing of the task.

It should be appreciated that the Summary is not intended to identify key or essential features of the embodiments of the present disclosure, or limit the scope of the present disclosure. Other features of the present disclosure will be understood more easily through the following description.

BRIEF DESCRIPTION OF THE DRAWINGS

Through the following detailed description with reference to accompanying drawings, the above and other objectives, features, and advantages of the present disclosure will become more apparent. In the drawings, multiple embodiments of the present disclosure are explained in an exemplary and non-restrictive manner, where.

DETAILED DESCRIPTION

Concepts of the present disclosure are now explained with reference to various example embodiments shown in the drawings. It should be appreciated that description of those embodiments is merely to enable those skilled in the art to better understand and further implement the present disclosure without suggesting any limitation to the scope disclosed herein in any manner. It should be noted that similar or same reference signs are used in the drawings where feasible, and similar or same reference signs can represent similar or same elements. Those skilled in the art will appreciate from the following description that alternative embodiments of the structure and method described in the text can be adopted without deviating from the principles of the present invention described herein.

In the context of the present disclosure, the term "includes" and its variants are to be read as open-ended terms that mean "includes, but is not limited to." The term "based on" is to be read as "based at least in part on." The term "one embodiment" is to be read as "at least one embodiment." The term "a further embodiment" is to be read as "at least a further embodiment." Other terms, which may occur but are not mentioned here, should not be interpreted or defined in a way that contradicts the concepts on which the embodiments of the present disclosure are based unless indicated otherwise.

As described above, with development of computer technologies, types of processing resources become richer and computing power thereof also becomes stronger. Processing resources, due to their distinctive characteristics, are particularly suitable for processing a variety of types of computing tasks, such as deep learning, machine learning, data mining, high-performance computing, etc. For example, a deep learning model is usually built with a large amount of parameters and the model may be trained through computing the large amount of parameters. However, the amount of computation required by deep learning is quite large, which leads to a need for assigning the computing tasks into a plurality of processing resources to complete the computation in parallel and aggregate computation results. An AllReduce operation may aggregate the obtained result of each processing resource and the aggregated results may be provided to each processing resource to facilitate subsequent computation or acquisition of a final computation result. In other words, it is often required to exchange a large amount of data between different processing resources. Particularly when the large amount of processing resources are respectively located in computing devices that are far away from each other, data exchange between each processing resource with other processing resources will occupy large amounts of network resources, and reduce overall efficiency of task processing.

To address the above problems and/or other potential problems, embodiments of the present disclosure propose a solution for processing a task. This solution can obtain a first group of processing results generated from processing, by a first group of processing resources of a first device, a first group of sub-tasks in the task. This solution can perform a first AllReduce operation on the first group of processing results to obtain a first AllReduce result. This solution can obtain a second AllReduce result from a second device. This solution can perform a third AllReduce operation on the first AllReduce result and the second AllReduce result to obtain a processing result of the task. In this way, the solution reduces data exchange between devices, thereby enhancing efficiency of processing the task.

Basic principles and implementations of the present disclosure will be explained below with reference to the drawings. It should be understood that the example embodiments are provided here to merely enable those skilled in the art to better understand and further implement embodiments of the present disclosure, rather than limiting the scope of the present disclosure in any manner.

Figure 1:
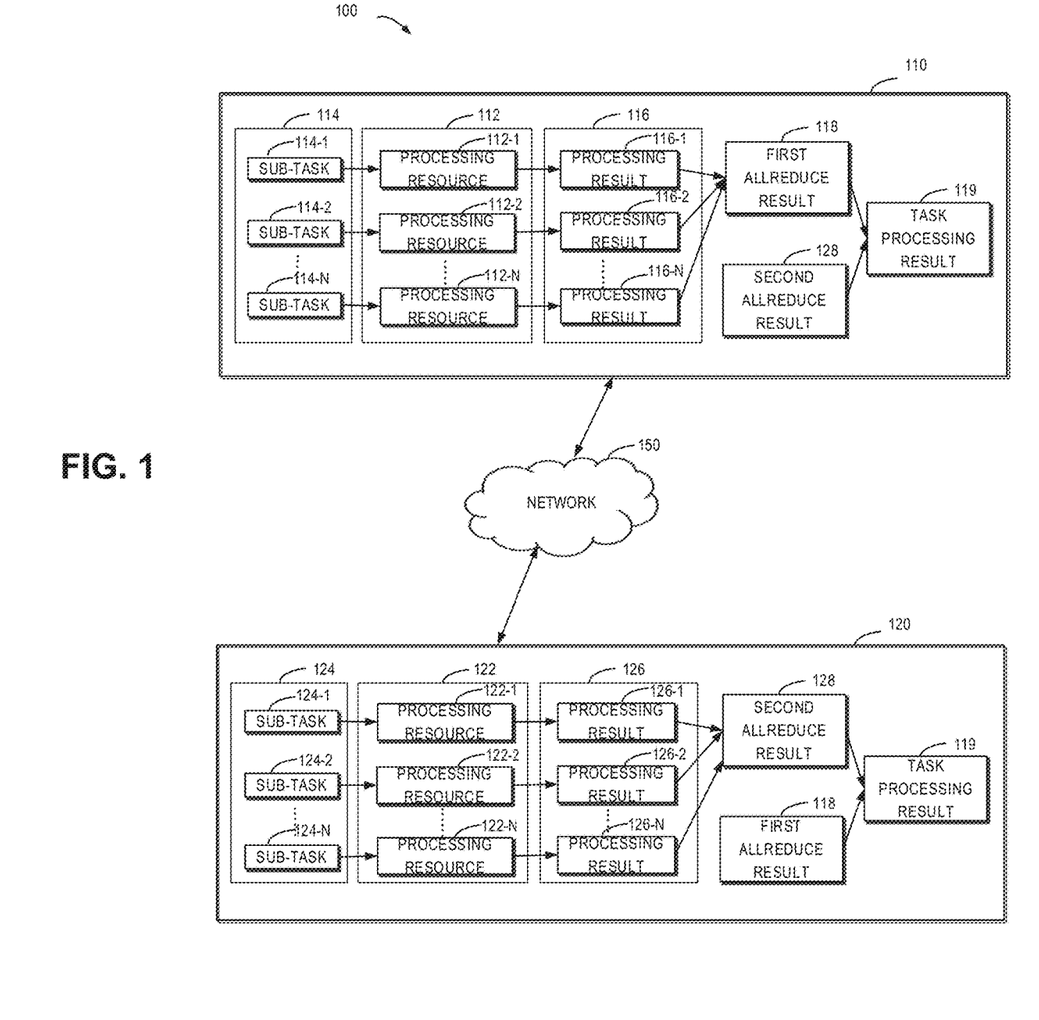
FIG. 1 illustrates a schematic diagram of an example environment 100 for processing a task in accordance with embodiments of the present disclosure.

FIG. 1 illustrates a schematic diagram of an example environment 100 for processing a task in accordance with embodiments of the present disclosure. As shown in FIG. 1, the environment 100 includes a first device 110, a second device 120 and a network 150. The first device 110 and the second device 120 may implement transmission of various data via the network 150. The network 150 may be a wired network, a wireless network or a combination thereof. For example, the network 150 may include, but not limited to, Internet, a wide area network, a metropolitan area network, a local area network, a virtual private network, a wireless communications network and the like.

The first device 110 and the second device 120 are computing devices capable of processing the task, and may be computers, servers or any other devices available for processing the task. Although two devices are illustrated in FIG. 1, it should be appreciated that this is only for the purpose of example, without suggesting any limitation to the scope of the present disclosure. In some embodiments, different numbers of other devices and/or other devices with different functions may also be included.

As shown in FIG. 1, the first device 110 includes a first group of processing resources 112, and the first group of resources 112 includes one or more processing resources 112-1, 112-2, . . . , 112-N, where N is a positive integer greater than 1. In some embodiments, the processing resources 112-1, 112-2, . . . , 112-N may include dedicated processing resources and universal processing resources, where the dedicated processing resources may include at least one of a graphics processing unit (GPU), a field programmable gate array (FPGA) and an artificial intelligence processor (AI processor) and the universal processing resources may include a central processing unit (CPU) and the like. A first group of sub-tasks 114 in one task includes one or more sub-tasks 114-1, 114-2, . . . , 114-N. Each sub-task may be assigned to one processing resource in the first group of processing resources 112 and each processing resource assigned with a sub-task may process the assigned sub-task to generate a first group of processing results 116. The first group of processing results 116 includes one or more processing results 116-1, 116-2, . . . , 116-N. The first device 110 may perform a first AllReduce operation on the processing results 116-1, 116-2, . . . , 116-N to obtain the first AllReduce result 118, thereby implementing an aggregation to the processing results 116-1, 116-2, . . . , 116-N in the first device 110.

Similar to the first device 110, the second device 120 may include a second group of processing resources 122. The second group of processing resources 122 includes one or more processing resources 122-1, 122-2, . . . , 122-N. A second group of sub-tasks 124 in one task includes one or more sub-tasks 124-1, 124-2, . . . , 124-N. Each sub-task may be assigned to one processing resource in the second group of processing resources 122 and each processing resource assigned with a sub-task may process the assigned sub-task to generate a second group of processing results 126. The second group of processing results 126 includes one or more processing results 126-1, 126-2, . . . , 126-N. The second device 120 may perform a second AllReduce operation on the processing results 126-1, 126-2, . . . , 126-N to obtain the second AllReduce result 128, thereby implementing an aggregation on the processing results 126-1, 126-2, . . . , 126-N in the second device 120.

As mentioned above, the first AllReduce result 118 and the second AllReduce result 128 are respectively obtained in the first device 110 and the second device 120. The first device 110 may receive from the second device 120 the second AllReduce result 128 and the second device 120 may receive from the first device 110 the first AllReduce result 118. The first device 110 and the second device 120 may perform a third AllReduce operation on the first AllReduce result 118 and the second AllReduce result 128 to obtain a task processing result 119, thereby implementing an aggregation to all processing results in the first device 110 and the second device 120.

The first device 110 and the second device 120 further include a memory. In some embodiments, the memory may have computer programs stored therein, and instructions of the programs may be executed by a processor to control operations of the corresponding device. It should be appreciated that any processing resource in the first device 110 and the second device 120 may act as the processor for executing the instructions. The first device 110 and the second device 120 may further include some other modules and/or devices not shown in FIG. 1, such as a communications module, an input/output device and the like. Although only two devices are shown in FIG. 1, it should be understood that three or more devices may also be used to process tasks.

Figure 2:
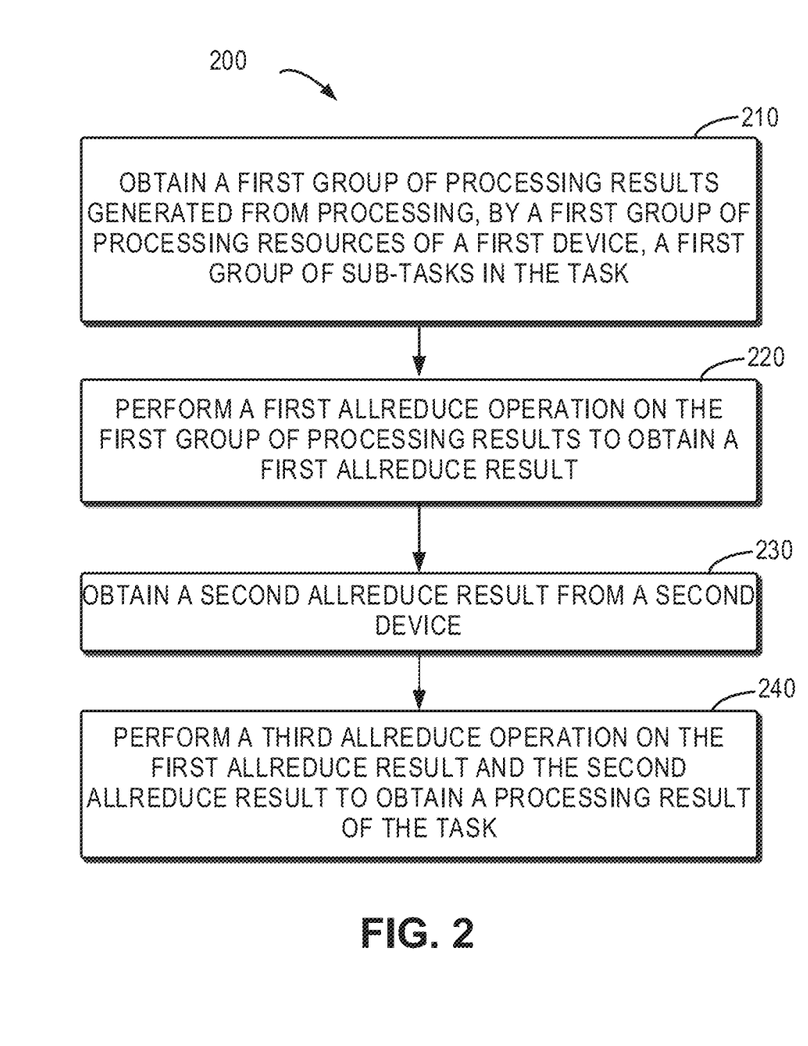
FIG. 2 illustrates a flowchart of a method 200 of processing a task in accordance with embodiments of the present disclosure.

FIG. 2 illustrates a flowchart of a method 200 for processing a task in accordance with embodiments of the present disclosure. It should be appreciated that at least a part in the method 200 may be performed by the first device 110 described above with reference to FIG. 1. The method 200 may also include blocks not shown and/or omit the shown blocks. The scope of the present disclosure is not restricted in this regard.

At block 210, the first device 110 obtains a first group of processing results 116 generated from processing, by a first group of processing resources 112, a first group of sub-tasks 114 in one task. In some embodiments, the number of individual sub-tasks in the first group of sub-tasks 114 is smaller than or equal to the number of individual processing resources in the first group of processing resources 112, such that each sub-task may be assigned to an individual processing resource for processing. Each processing resource assigned with a sub-task may independently perform the assigned sub-task, so as to obtain the first group of processing results 116. In the example of deep learning, the first group of processing results 116 may be a first group of gradients obtained from processing the first group of sub-tasks. Accordingly, one task may be divided into a plurality of sub-tasks, so as to process the task in parallel with a plurality of processing resources, thereby enhancing efficiency of task processing.

At block 220, the first device 110 performs the first AllReduce operation on the first group of processing results 116 to obtain a first AllReduce result 118. The first AllReduce operation may implement an aggregation of the first group of processing results 116. In some embodiments, the first AllReduce operation may include at least one of the following types: summation, averaging, taking a maximum value, and taking a minimum value on the first group of processing results 116. In the example of deep learning, the first group of processing results is a first group of gradients and the first AllReduce operation performed on the first group of gradients may include performing the summation on the first group of gradients to obtain an aggregated gradient. The first device 110 may further provide the aggregated gradient to each processing resource to facilitate proceeding of subsequent tasks. In this way, processing results of a plurality of processing resources within a single device may be aggregated. As a data exchange between processing resources within a single device does not occupy network resources and has a rapid exchange speed, time cost by the data exchange may be reduced.

Alternatively, in some embodiments, if only one processing resource in the first device 110 is assigned with a sub-task, the processing result of the processing resource will serve as the first AllReduce result 118 of the first device 110, without performing an AllReduce operation. In this way, the operation of the first device 110 can be simplified.

At block 230, the first device 110 obtains the second AllReduce result 128 from the second device 120. Similar to the first AllReduce result 118, the second AllReduce result 128 is obtained from performing, by the second device 120, the second AllReduce operation on the second group of processing results 126, and the second group of processing results 126 is generated from the second group of processing resources 122 performing the second group of sub-tasks 124. In some embodiments, the second AllReduce operation and the first AllReduce operation are the same type of AllReduce operation, so that the second AllReduce result 128 and the first AllReduce result 118 are the same type of AllReduce result (e.g., both being summation result or averaging result etc.), so as to facilitate performing subsequent operations. In the example of deep learning, the first group of gradients generated in the second device may be summed to obtain an aggregated gradient. In this way, it is unnecessary for the first device 110 to obtain processing results from each processing resource of the second device 120. Instead, when only one data exchange is performed between the devices, the first device 110 may then obtain the aggregated processing result of the second device 120.

At block 240, the first device 110 performs a third AllReduce operation on the first AllReduce result 118 and the second AllReduce result 128 to obtain a processing result of the task. In some embodiments, the first AllReduce operation, the second AllReduce operation and the third AllReduce operation are of the same type. In the example of deep learning, a summation may be performed again on the summed gradient in the first device 110 and on the summed gradient in the second device 120, so as to aggregate all gradients in the first device 110 and the second device 120. In some embodiments, the first device 110 may provide the obtained task processing result to the first group of processing resources 112, to facilitate subsequent operations. Compared with obtaining a task processing result from directly performing an AllReduce operation between each processing resource in each device, the AllReduce operation is first performed once on the processing result at a single device and then on the AllReduce result of each device, which greatly reduces the occupation of network resources, decreases the amount of data that needs to be exchanged, and thus enhances efficiency of obtaining the task processing result.

Figure 3:
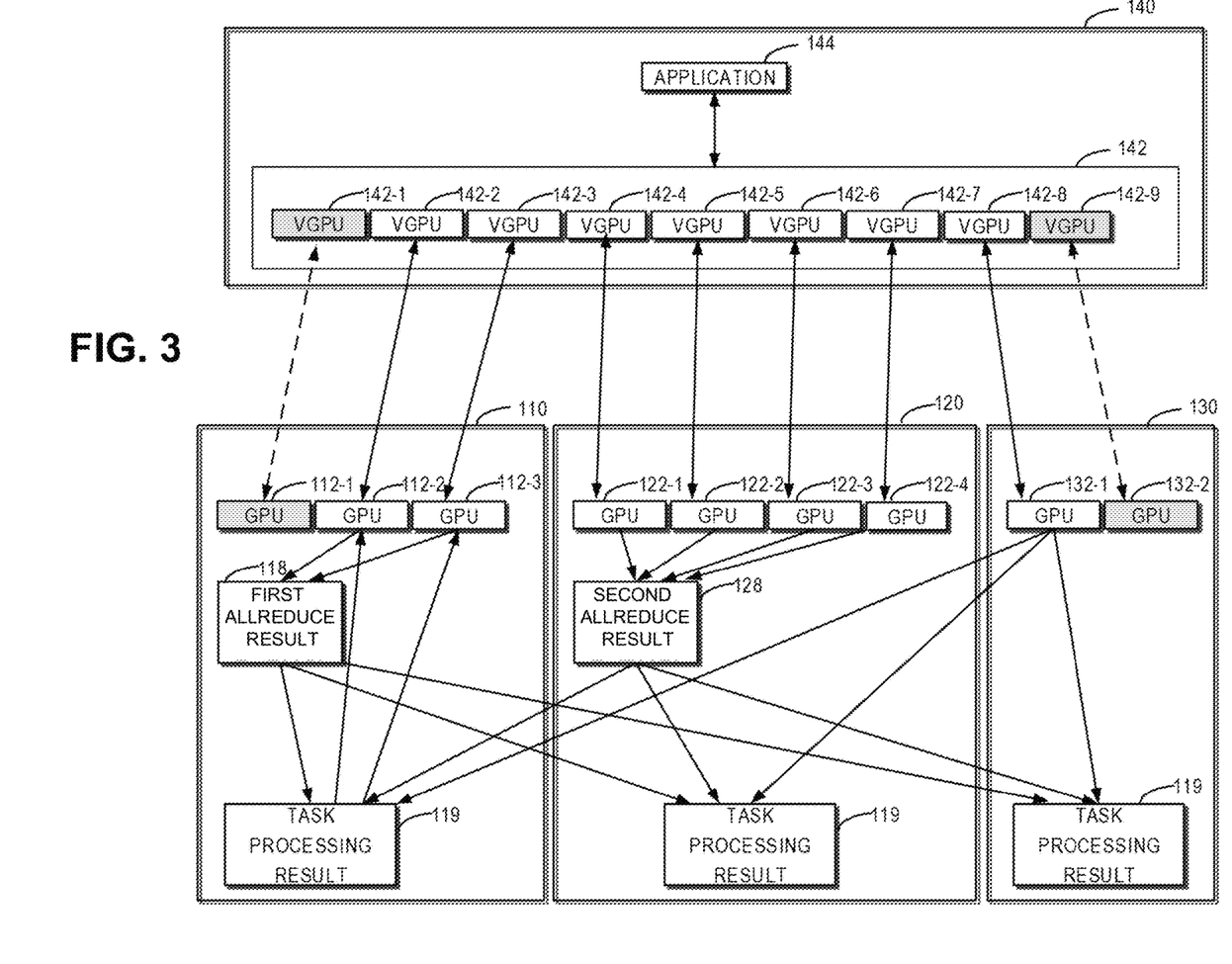
FIG. 3 illustrates a schematic block diagram for processing a task in accordance with embodiments of the present disclosure.

FIG. 3 illustrates a schematic block diagram for processing a task in accordance with embodiments of the present disclosure. In this example, although GPU is taken as an example of a processing resource for processing the task, it should be understood that other types of processing resources may also be adopted to process the task. User device 140 includes a group of virtual graphics processing units (VGPUs) 142. One group of VGPUs includes 9 VGPUs 142-1, 142-2, . . . , 142-9. It should be appreciated that the number of VGPUs included in the user device 140 may be any suitable number. The user device 140, for example, may include, but is not limited to, any computer, server, virtual machine or any other devices with task processing capability and the like. Each VGPU in the group of VGPUs 142 corresponds to one GPU in the first device 110, the second device 120 and the third device 130. Although the VGPUs and the GPUs are in a one-to-one corresponding relation in the example of FIG. 3, it should be appreciated the VGPUs and the GPUs may also have a many-to-many corresponding relation. For example, one VGPU may correspond to a plurality of GPUs and one GPU may also correspond to a plurality of VGPUs.

An application 144 may initiate, at the user device 140, a task for a group of VGPUs 142, where the task is divided into a plurality of sub-tasks and each sub-task is assigned to one VGPU. In the example of FIG. 3, the task is divided into 7 sub-tasks, which the 7 sub-tasks are respectively assigned to 7 VGPUs 142-2, 142-3, . . . , 142-8. It should be understood that the task may be divided into any number of sub-tasks and the present disclosure is not restricted in this regard. Due to the corresponding relation between the VGPUs and the GPUs, the first group of GPUs 112-2 and 112-3 in the first device 110, the second group of GPUs 122-1, 122-2, 122-3 and 122-4 in the second device 120, and the third group of GPU 132-1 in the third device 130 respectively receive respective sub-tasks. In this way, one task may be assigned to a plurality of GPUs for parallel processing to accelerate speed of processing the task.

In each device, each GPU receives with a sub-task process the received sub-task to respectively obtain a task processing result. The AllReduce operation is performed, at the first device 110, on processing results of the GPUs 112-2 and 112-3 to obtain the first AllReduce result 118. The AllReduce operation is also performed, at the second device 120, on the GPUs 122-1, 122-2, 122-3 and 122-4 to obtain the second AllReduce result 128. Since only one GPU 132-1 of GPUs 132-1 and 132-2 is assigned with a sub-task at the third device 130, it is unnecessary to perform the AllReduce operation on the processing result of the GPU 132-1. In this way, the respective aggregated processing result may be obtained at each device to facilitate proceeding of subsequent operations.

As shown in FIG. 3, the first device 110 obtains the second AllReduce result 128 from the second device 120 and the processing result of the GPU 132-1 from the third device 130 and then performs the AllReduce operation again on the first AllReduce result 118, the second AllReduce result 128 and the processing result of the GPU 132-1 of the third device 130, to obtain a task processing result 119. The task processing result 119 may be provided to GPUs 112-2 and 112-3 to facilitate subsequent processing or returning a corresponding result to the user device 140. In this way, aggregation of the processing result of each sub-task is implemented by aggregating the aggregated results of the three devices one more time, thereby avoiding low exchange efficiency and high occupation rate of network resources resulted from direct data exchange between each GPU in different devices. Particularly, when it is required that a task is processed with large amounts of computing devices and GPUs, the above method can significantly enhance efficiency of processing the task.

Similar to the operation of the first device 110, the second device 120 and the third device 130 may also obtain AllReduce results from other devices and perform the AllReduce operation again on the AllReduce results of other devices and the AllReduce results of the second and third devices per se, so as to obtain the task processing result 119. In some embodiments, the task processing result 119 may be respectively provided to the GPUs 122-1, 122-2, 122-3 and 122-4 and GPU 132-1 to facilitate subsequent processing or returning a corresponding result to the user device 140. Alternatively, in some embodiments, the second device 120 and the third device 130 may also obtain the task processing result 119 from the first device 110 without performing the AllReduce operation again. In this way, each device can obtain the task processing result 119 while occupying fewer network resources.

Although it is illustrated in the example of FIG. 3 that the application 144 assigns, via one group of VGPUs 142, tasks to the GPUs in the first device 110, the second device 120 and the third device 130, it should be understood that the application 144 may also adopt other suitable manners to assign the task. For example, the task may be assigned via an application program interface (API) and the like. The scope of the present disclosure is not restricted in this regard.

Figure 4:
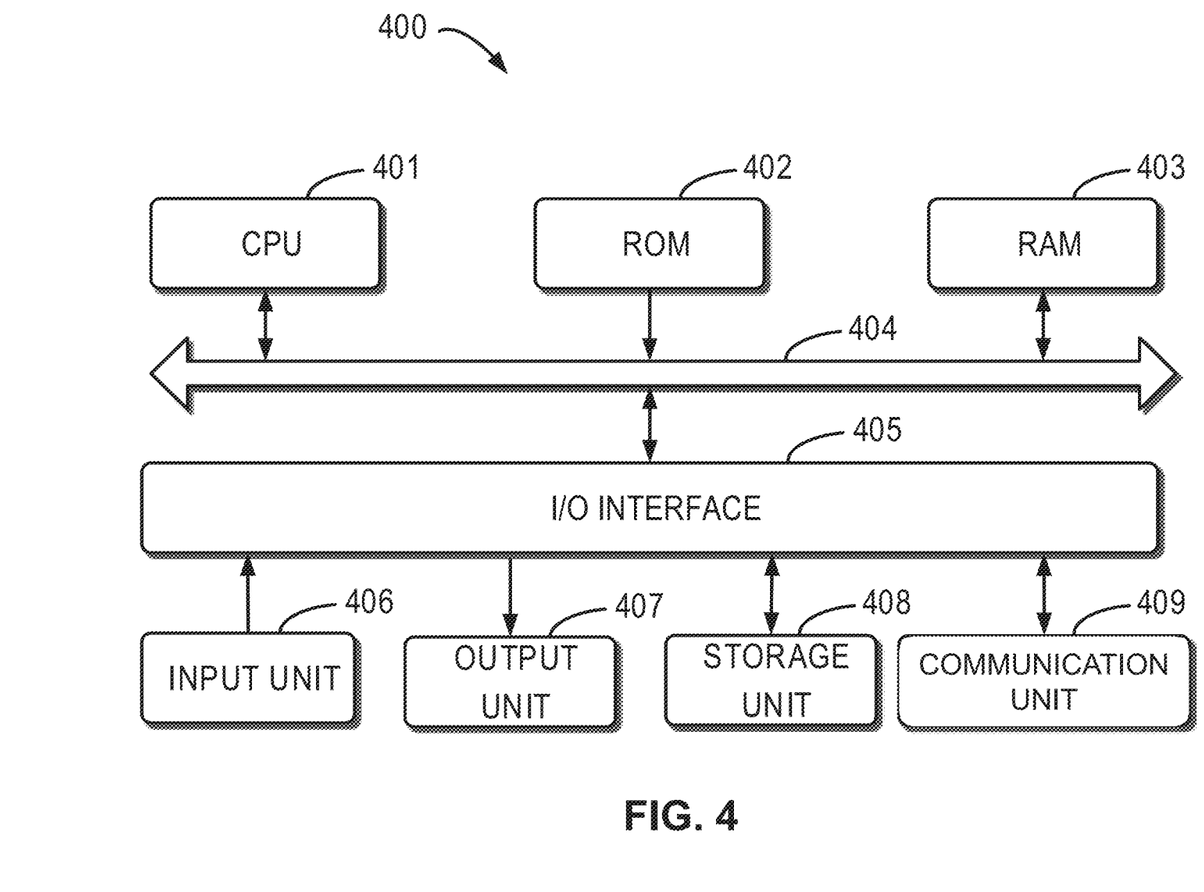
FIG. 4 illustrates a schematic block diagram of a device 400 for implementing embodiments of the present disclosure.

FIG. 4 illustrates a schematic block diagram of a device 400 for implementing embodiments of the present disclosure. The device 400 may be the device 110 or device 120 described above with reference to FIG. 1. As shown, the device 400 includes a central processing unit (CPU) 401 and dedicated processing resources (not shown) like GPUs etc., which can execute various suitable actions and processing based on computer program instructions stored in a read-only memory (ROM) 402 or computer program instructions loaded in a random-access memory (RAM) 403 from a storage unit 408. The RAM 403 can also store various kinds of programs and data required by the operations of the device 400. The CPU 401, ROM 402 and RAM 403 are connected to each other via a bus 404. An input/output (I/O) interface 405 is also connected to the bus 404.

A plurality of components in the device 400 is connected to the I/O interface 405, including: an input unit 406, such as a keyboard, a mouse and the like; an output unit 407, e.g., various kinds of displays and loudspeakers etc.; a storage unit 408, such as a disk, an optical disk etc.; and a communication unit 409, such as a network card, modem, a wireless transceiver and the like. The communication unit 409 allows the device 400 to exchange information/data with other devices via a computer network, such as Internet, and/or various telecommunication networks.

Various methods and processes described above may be performed by the processing unit 401. For example, in some embodiments, the method may be implemented as computer software programs tangibly included in a machine-readable medium, e.g., storage unit 408. In some embodiments, the computer program may be partially or fully loaded and/or mounted to the device 400 via the ROM 402 and/or communication unit 409. When the computer program is loaded to the RAM 403 and executed by the CPU 401, one or more steps of the above described method or process can be executed.

In some embodiments, the above described method and process may be implemented as a computer program product, which may include a computer-readable storage medium loaded thereon with computer-readable program instructions for performing various aspects of the present disclosure.

The computer-readable storage medium may be a tangible apparatus that maintains and stores instructions utilized by the instruction-performing apparatuses. The computer-readable storage medium may be, but not limited to, an electrical storage device, a magnetic storage device, an optical storage device, an electromagnetic storage device, a semiconductor storage device or any appropriate combinations of the above. More concrete examples of the computer-readable storage medium (non-exhaustive list) include: a portable computer disk, a hard disk, RAM, ROM, an erasable programmable read-only memory (EPROM or flash), a static random-access memory (SRAM), a portable compact disk read-only memory (CD-ROM), a digital versatile disk (DVD), a memory stick, a floppy disk, a mechanical coding device, a punched card stored with instructions thereon, or a projection in a slot, and any appropriate combinations of the above. The computer-readable storage medium utilized herein is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The computer-readable program instructions described herein may be downloaded from the computer-readable storage medium to each computing/processing device, or to an external computer or external storage via Internet, a local area network, a wide area network and/or a wireless network. The network may include a copper-transmitted cable, an optical fiber transmission, a wireless transmission, a router, a firewall, a switch, a network gate computer and/or an edge server. The network adapter card or network interface in each computing/processing device receives computer-readable program instructions from the network and forwards the computer-readable program instructions for storage in the computer-readable storage medium of each computing/processing device.

The computer program instructions for performing operations of the present disclosure may be assembly instructions, instructions of an instruction set architecture (ISA), machine instructions, machine-related instructions, microcodes, firmware instructions, state setting data, or source codes or target codes written in any combinations of one or more programming languages, where the programming languages include object-oriented programming languages and traditional procedural programming languages. The computer-readable program instructions may be implemented fully on a user computer, partially on a user computer, as an individual software package, partially on a user computer and partially on a remote computer, or completely on a remote computer or server. In the case where the remote computer is involved, the remote computer may be connected to the user computer via any type of networks, including a local area network (LAN) and a wide area network (WAN), or to an external computer (e.g., connected via Internet using an Internet service provider). In some embodiments, state information of the computer-readable program instructions is used to customize an electronic circuit, e.g., a programmable logic circuit, a field programmable gate array (FPGA) or a programmable logic array (PLA). The electronic circuit may execute computer-readable program instructions to implement various aspects of the present disclosure.

The computer-readable program instructions may be provided to the processing unit of general-purpose computer, dedicated computer or other programmable data processing apparatuses to manufacture a machine, such that the instructions that, when executed by the processing unit of the computer or other programmable data processing apparatuses, generate a device for implementing functions/actions stipulated in one or more blocks in the flow chart and/or block diagram. The computer-readable program instructions may also be stored in the computer-readable storage medium and cause the computer, programmable data processing apparatus and/or other devices to work in a particular manner, such that the computer-readable medium stored with instructions includes an article of manufacture which includes instructions for implementing various aspects of the functions/actions stipulated in one or more blocks of the flow chart and/or block diagram.

The computer-readable program instructions may also be loaded into a computer, other programmable data processing apparatuses or other devices, so as to perform a series of operation steps on the computer, other programmable data processing apparatuses or other devices to generate a computer-implemented process. Therefore, the instructions executed on the computer, other programmable data processing apparatuses or other devices implement functions/actions stipulated in one or more blocks of the flow chart and/or block diagrams.

The flow chart and block diagrams in the drawings illustrate system architecture, functions and operations that may be implemented by a device, a method and a computer program product according to multiple implementations of the present disclosure. In this regard, each block in a flow chart or block diagram may represent a module, a part of program segment or code, where the module and the part of program segment or code include one or more executable instructions for performing stipulated logic functions. In some alternative implementations, it should be noted that the functions indicated in the block may also take place in an order different from the one indicated in the drawings. For example, two successive blocks may be in fact executed in parallel or sometimes in a reverse order dependent on the involved functions. It should also be noted that each block in the block diagram and/or flow chart and combinations of the blocks in the block diagram and/or flow chart may be implemented by a hardware-based system exclusive for performing stipulated functions or actions, or by a combination of dedicated hardware and computer instructions.

Various embodiments of the present disclosure have been described above and the above description is only exemplary rather than exhaustive and is not limited to the embodiments disclosed herein. Many modifications and alterations, without deviating from the scope and spirit of the explained various embodiments, will be readily apparent to those skilled in the art. The selection of terms in the text aims to best explain principles and actual applications of each embodiment and technical improvements made to the technology in the market by each embodiment, so as to enable those of ordinary skill in the art to understand embodiments of the present disclosure.

What is claimed is:

1. A method of processing a task, comprising:
    initiating, at an application of a user device, a task for processing, the task being divided into a plurality of sub-tasks;
    responsive to each sub-task of the plurality of sub-tasks being assigned to a respective processing resource of a corresponding group of processing resources of the user device,
        receiving, at a first group of processing resources of a first device from one or more respective processing resources of the corresponding group of processing resources of the user device, a first group of sub-tasks in the task;
        receiving, at a second group of processing resources of a second device from one or more other respective processing resources of the corresponding group of processing resources of the user device, a second group of sub-tasks in the task; and
        receiving, at a third group of processing resources of a third device from one or more remaining respective processing resources of the corresponding group of processing resources of the user device, a third group of sub-tasks in the task;

obtaining a first group of processing results generated from processing, by the first group of processing resources of the first device, the first group of sub-tasks in the task;

performing, by the first device, a first reduce operation to aggregate the first group of processing results to obtain a first reduce result;

obtaining a second reduce result from the second device, the second reduce result being obtained by performing a second reduce operation to aggregate a second group of processing results generated from processing, by the second group of processing resources of the second device, the second group of sub-tasks in the task;

obtaining at least one processing result generated from processing, by at least one processing resource of the third group of processing resources of the third device, the third group of sub-tasks in the task;

performing a third reduce operation on the first reduce result, the second reduce result, and the processing result of the at least one processing resource of the third group of processing resources of the third device, to obtain a processing result of the task; and providing the processing result of the task to one or more processing resources of at least one of the first group of processing resources of the first device, the second group of processing resources of the second device and the third group of processing resources of the third device for further processing;

wherein each of the processing resources in the group of processing resources of the user device has a one-to-one correspondence with a respective processing resource in the processing resources of the first group of processing resources of the first device, the second group of processing resources of the second device and the third group of processing resources of the third device.

2. The method of claim 1, wherein the first reduce operation, the second reduce operation and the third reduce operation comprise a first AllReduce operation, a second AllReduce operation and a third AllReduce operation, respectively, and are of a same type.

3. The method of claim 1, wherein the first reduce operation, the second reduce operation and the third reduce operation comprise at least one of the following types of operations:
summation,
averaging,
taking a maximum value, and
taking a minimum value.

4. The method of claim 1, wherein the processing resources comprise dedicated processing resources.

5. The method of claim 4, wherein the dedicated processing resources comprise at least one of a graphics processing unit (GPU), a field programmable gate array (FPGA) and an artificial intelligence processor (AI processor).

6. The method of claim 1, further comprising:
providing the processing result of the task to the first group of processing resources of the first device.

7. An electronic device, comprising:
a processor; and
a memory storing computer program instructions, the processor executing the computer program instructions in the memory to control the device to perform actions comprising:
initiating, at an application of a user device, a task for processing, the task being divided into a plurality of sub-tasks;
responsive to each sub-task of the plurality of sub-tasks being assigned to a respective processing resource of a corresponding group of processing resources of the user device,
receiving, at a first group of processing resources of a first device from one or more respective processing resources of the corresponding group of processing resources of the user device, a first group of sub-tasks in the task;
receiving, at a second group of processing resources of a second device from one or more other respective processing resources of the corresponding group of processing resources of the user device, a second group of sub-tasks in the task; and
receiving, at a third group of processing resources of a third device from one or more remaining respective processing resources of the corresponding group of processing resources of the user device, a third group of sub-tasks in the task;
obtaining a first group of processing results generated from processing, by the first group of processing resources of the first device, the first group of sub-tasks in the task;
performing, by the first device, a first reduce operation to aggregate the first group of processing results to obtain a first reduce result;
obtaining a second reduce result from the second device, the second reduce result being obtained by performing a second reduce operation to aggregate a second group of processing results generated from processing, by the second group of processing resources of the second device, the second group of sub-tasks in the task;
obtaining at least one processing result generated from processing, by at least one processing resource of the third group of processing resources of the third device, the third group of sub-tasks in the task;
performing a third reduce operation on the first reduce result, the second reduce result, and the processing result of the at least one processing resource of the third group of processing resources of the third device, to obtain a processing result of the task; and
providing the processing result of the task to one or more processing resources of at least one of the first group of processing resources of the first device, the second group of processing resources of the second device and the third group of processing resources of the third device for further processing;
wherein each of the processing resources in the group of processing resources of the user device has a one-to-one correspondence with a respective processing resource in the processing resources of the first group of processing resources of the first device, the second group of processing resources of the second device and the third group of processing resources of the third device.

8. The electronic device of claim 7, wherein the first reduce operation, the second reduce operation and the third reduce operation comprise a first AllReduce operation, a second AllReduce operation and a third AllReduce operation, respectively, and are of a same type.

9. The electronic device of claim 7, wherein the first reduce operation, the second reduce operation and the third reduce operation comprise at least one of the following types of operations:
summation,
averaging, taking a maximum value, and taking a minimum value.

10. The electronic device of claim 7, wherein the processing resources comprise dedicated processing resources.

11. The electronic device of claim 10, wherein the dedicated processing resources comprise at least one of a graphics processing unit (GPU), a field programmable gate array (FPGA) and an artificial intelligence processor (AI processor).

12. The electronic device of claim 7, wherein the actions further comprise:

providing the processing result of the task to the first group of processing resources of the first device.

13. A computer program product being tangibly stored on a non-transitory computer storage medium and comprising machine-executable instructions which, when executed by a device, cause the device to perform actions comprising:

initiating, at an application of a user device, a task for processing, the task being divided into a plurality of sub-tasks;

responsive to each sub-task of the plurality of sub-tasks being assigned to a respective processing resource of a corresponding group of processing resources of the user device, receiving, at a first group of processing resources of a first device from one or more respective processing resources of the corresponding group of processing resources of the user device, a first group of sub-tasks in the task;

receiving, at a second group of processing resources of a second device from one or more other respective processing resources of the corresponding group of processing resources of the user device, a second group of sub-tasks in the task; and receiving, at a third group of processing resources of a third device from one or more remaining respective processing resources of the corresponding group of processing resources of the user device, a third group of sub-tasks in the task;

obtaining a first group of processing results generated from processing, by the first group of processing resources of the first device, the first group of sub-tasks in the task;

performing, by the first device, a first reduce operation to aggregate the first group of processing results to obtain a first reduce result;

obtaining a second reduce result from the second device, the second reduce result being obtained by performing a second reduce operation to aggregate a second group of processing results generated from processing, by the second group of processing resources of the second device, the second group of sub-tasks in the task;

obtaining at least one processing result generated from processing, by at least one processing resource of the third group of processing resources of the third device, the third group of sub-tasks in the task;

performing a third reduce operation on the first reduce result, the second reduce result, and the processing result of the at least one processing resource of the third group of processing resources of the third device, to obtain a processing result of the task; and providing the processing result of the task to one or more processing resources of at least one of the first group of processing resources of the first device, the second group of processing resources of the second device and the third group of processing resources of the third device for further processing;

wherein each of the processing resources in the group of processing resources of the user device has a one-to-one correspondence with a respective processing resource in the processing resources of the first group of processing resources of the first device, the second group of processing resources of the second device and the third group of processing resources of the third device.

14. The computer program product of claim 13, wherein the first reduce operation, the second reduce operation and the third reduce operation comprise a first AllReduce operation, a second AllReduce operation and a third AllReduce operation, respectively, and are of a same type.

15. The computer program product of claim 13, wherein the first reduce operation, the second reduce operation and the third reduce operation comprise at least one of the following types of operations:

summation, averaging, taking a maximum value, and taking a minimum value.

16. The computer program product of claim 13, wherein the processing resources comprise dedicated processing resources.

17. The computer program product of claim 16, wherein the dedicated processing resources comprise at least one of a graphics processing unit (GPU), a field programmable gate array (FPGA) and an artificial intelligence processor (AI processor).

18. The computer program product of claim 13, wherein the machine-executable instructions which, when executed by the device, cause the device to further perform an action comprising:

providing the processing result of the task to the first group of processing resources of the first device.

19. The computer program product of claim 13, wherein the machine-executable instructions which, when executed by the device, cause the device to further perform an action comprising:

providing the processing result of the task to the second group of processing resources of the second device.

20. The computer program product of claim 13, wherein the machine-executable instructions which, when executed by the device, cause the device to further perform an action comprising:

providing the processing result of the task to the third group of processing resources of the third device.

* * * * *